W. KEENAN.
Hat Pouncing Machine.
No. 202,829. Patented April 23, 1878.
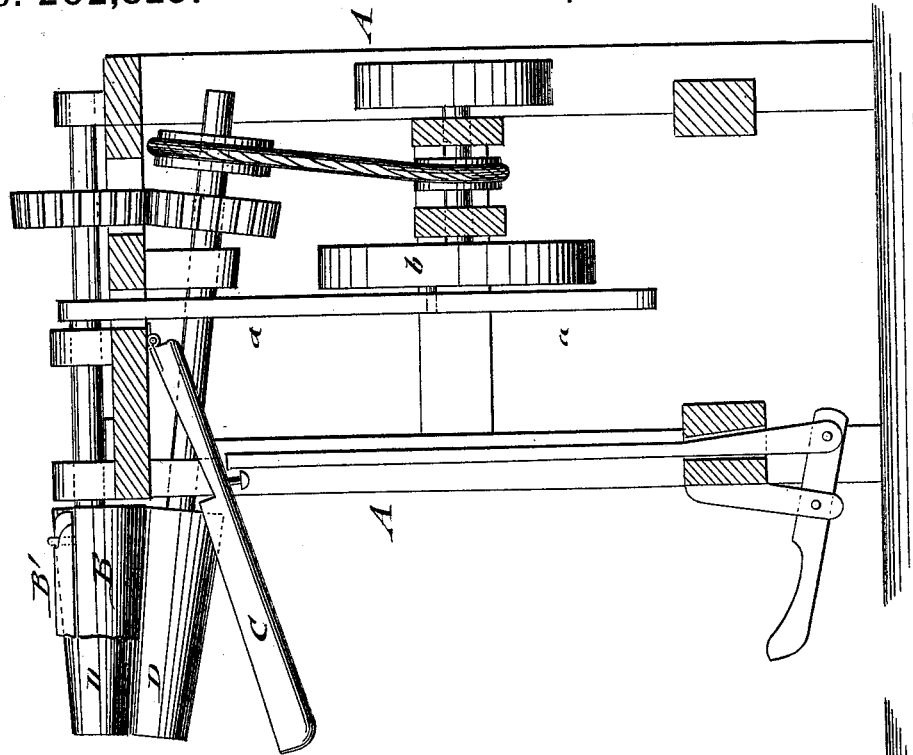
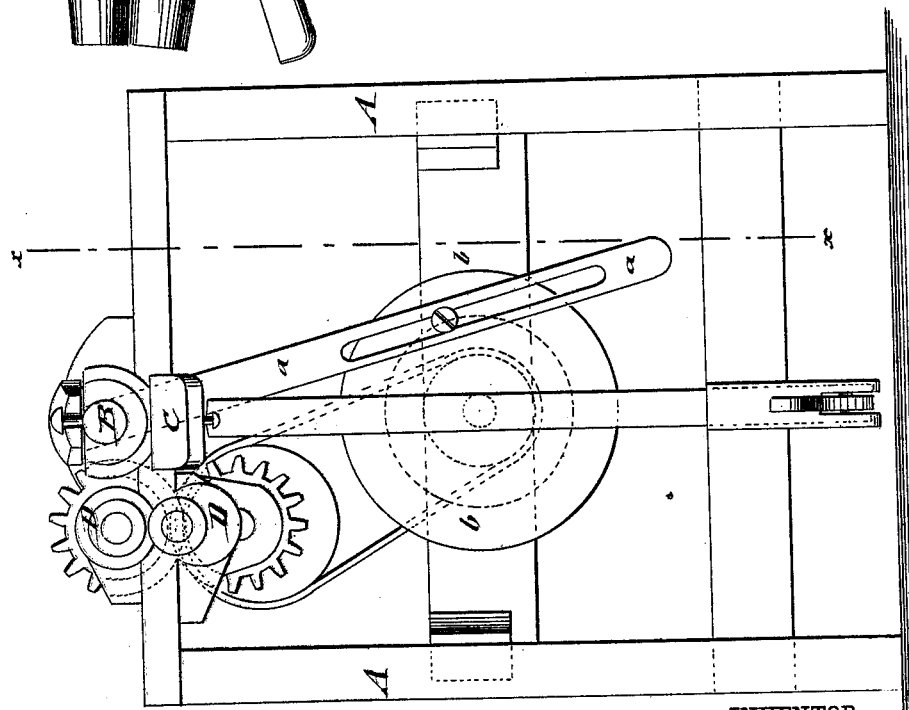
WITNESSES:
INVENTOR:
W. Keenan
BY
ATTORNEYS.

UNITED STATES PATENT OFFICE.

WILLIAM KEENAN, OF BROOKLYN, NEW YORK, ASSIGNOR TO HIMSELF AND NICHOLAS B. HOOPER, OF SAME PLACE.

IMPROVEMENT IN HAT-POUNCING MACHINES.

Specification forming part of Letters Patent No. 202,829, dated April 23, 1878; application filed March 1, 1878.

*To all whom it may concern:*

Be it known that I, WILLIAM KEENAN, of the city of Brooklyn, county of Kings, and State of New York, have invented a new and Improved Hat-Pouncing Machine, of which the following is a specification:

In the accompanying drawing, Figure 1 represents a front elevation, and Fig. 2 a vertical transverse section on line $x\ x$, Fig. 1, of my improved hat-pouncing machine.

Similar letters of reference indicate corresponding parts.

This invention has reference to an improved machine for pouncing the brims of hats in an even, rapid, and superior manner, by providing a uniform rotary reciprocating motion for the sand-paper block, below which the brims are passed; and the invention consists in the combination of a tapering sand-paper block, to which rotary reciprocating motion is imparted, with a hinged and treadle-acted holder or table, and with suitable feed-rolls, by which the brims are drawn through between the pouncing-block and table.

By reference to the drawing, A represents the frame of my improved hat-pouncing machine, which supports, in suitable bearings at the top part, the shaft of the pouncing-block B, that is covered in the usual manner with sand-paper, attached by a removable top slide-piece, B'. The pouncing-block is of slightly conical shape, and receives a rotary reciprocating motion by means of a crank-arm, $a$, that is affixed to the rear end of the shaft of the pouncing-block, and connected by its slotted end with a crank-pin of a disk or crank-arm, $b$, revolved by belt-and-pulley connection with the driving-shaft. To the under side of the top of frame A is hinged a swinging table or support, C, with flat top surface, that is thrown, by means of a treadle-and-rod connection, against the under side of the pouncing-block, so as to expose the hat-brim placed thereon to the pouncing action of the block. The uniform rotary reciprocating motion of the pouncing-block exerts an even pouncing action on the brim in connection with conical draw-rolls D, that are arranged sidewise of the pouncing-block, and receive their motion by a bevel-gear placed on their inclined shafts, and by a belt-and-pulley connection with the revolving shaft of the crank-disk. The uniform rotary reciprocating motion of the pouncing-block forms a close imitation of the work done by hand, and accomplishes the pouncing of hat-brims in a uniform, quick, and effective manner by the use of a very simple and effective mechanism.

I am aware that vibrating pouncing-plates provided with a treadle, by means of which they may be separated for the insertion or removal of a hat, in combination with laterally-adjustable feed-rollers, have heretofore been used, and this I do not claim.

Having thus fully described my invention, I claim as new and desire to secure by Letters Patent—

The combination, in a hat-pouncing machine, of conical draw-rolls with a pouncing-block, having a uniform rotary reciprocating motion, and with a hinged and treadle-acted table or holder below the block, substantially as and for the purpose specified.

WILLIAM KEENAN.

Witnesses:
C. SEDGWICK,
J. H. SCARBOROUGH.